July 2, 1963  W. E. THIBODEAU  3,095,942
SONIC VIBRATOR
Filed Jan. 23, 1959  3 Sheets-Sheet 1
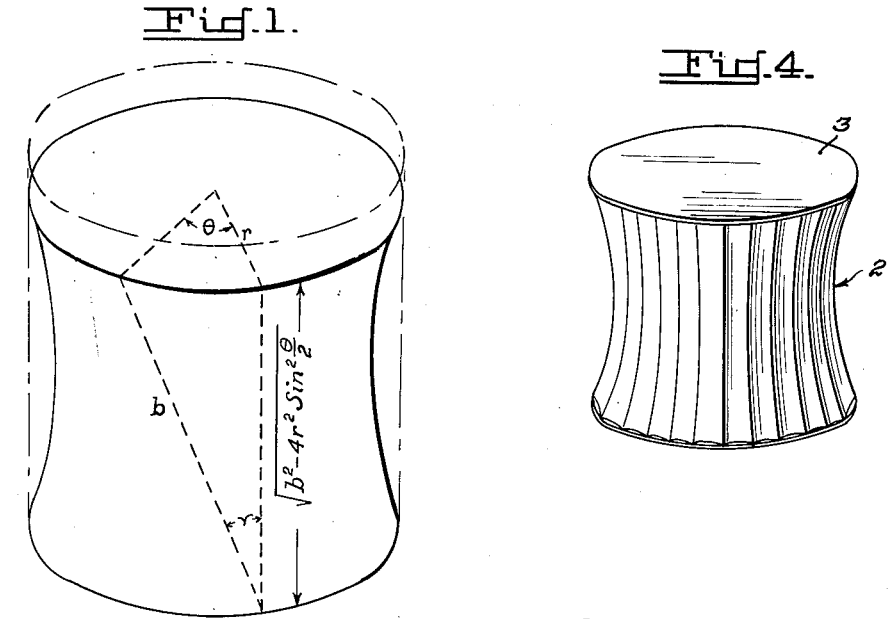
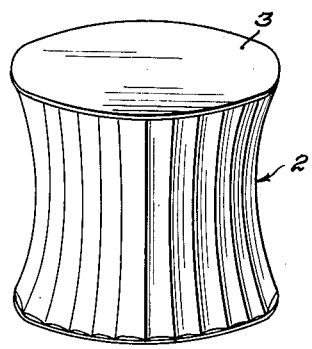
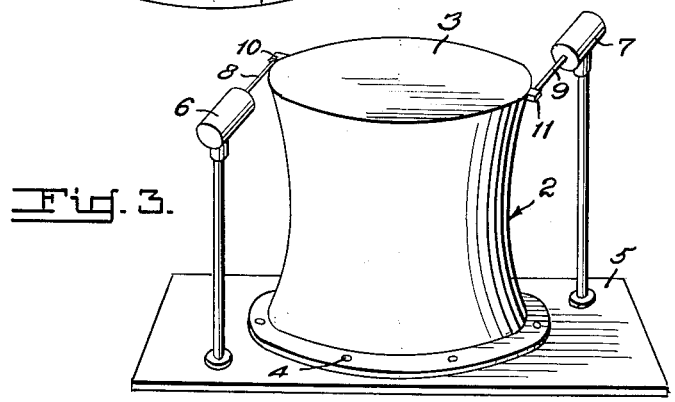
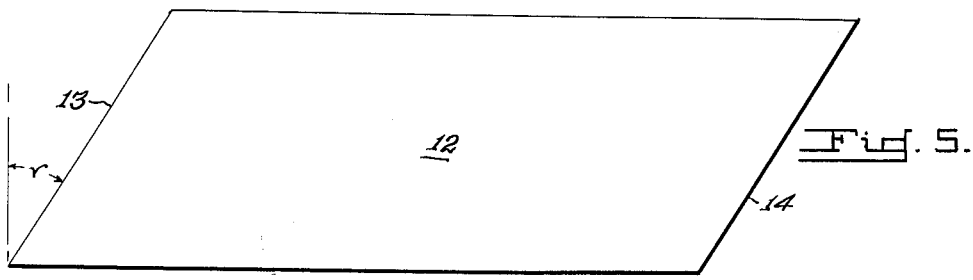
INVENTOR.
Wilfred E. Thibodeau July 2, 1963  W. E. THIBODEAU  3,095,942
SONIC VIBRATOR
Filed Jan. 23, 1959  3 Sheets-Sheet 3
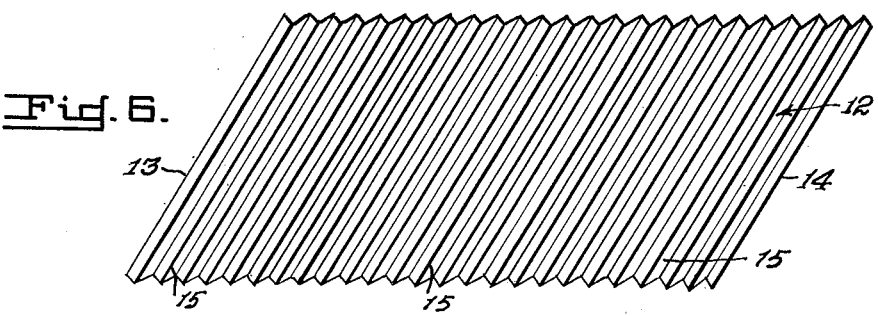
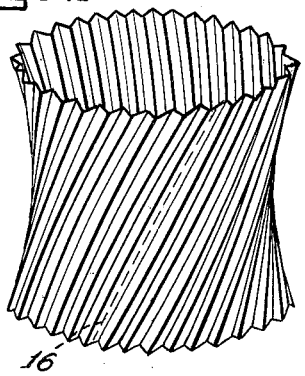
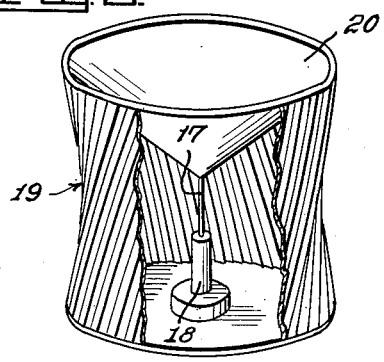
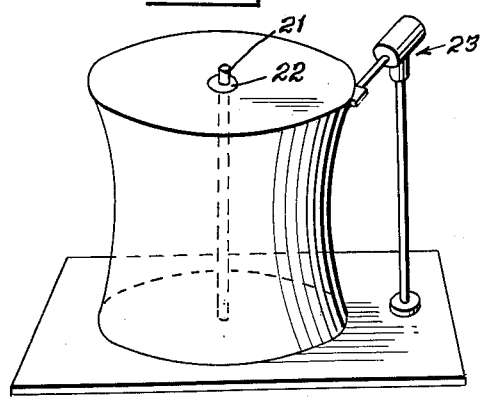
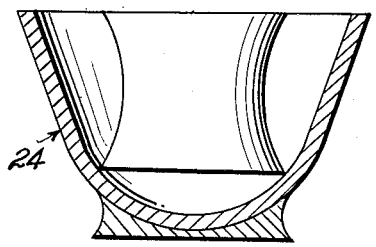
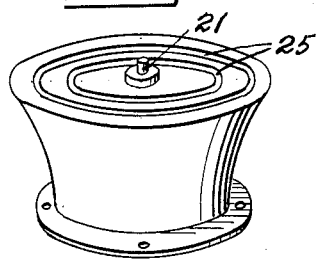
*INVENTOR:*
Wilfred E. Thibodeau though an angle $\theta$ about the cylinder axis, the body will diminish in overall volume, and the resultant volume at any selected value of $\theta$ is given by

United States Patent Office 3,095,942
Patented July 2, 1963

3,095,942
SONIC VIBRATOR
Wilfred E. Thibodeau, Falls Church, Va.
(361 NE. Felton Ave., Port Charlotte, Fla.)
Filed Jan. 23, 1959, Ser. No. 788,563
19 Claims. (Cl. 181—32)

This invention relates to a vibrator, and in particular to a sonic device. Heretofore such devices, as exemplified for instance in loudspeakers, have consisted essentially of a moving piston element, such as a disc or cone, arranged to reciprocate in a direction generally transverse to its surface. In fact, theoretical treatises on sonics are based on this simple type of source.

The present invention contemplates a sound-generating surface which is designed to be activated by a movement of torsion imparted to a hollow body, which results in volume changes in the body and gives rise to 3-dimensional pulsation, with multiple components of vibration of varying type and magnitude, and which therefore improves the frequency response and provides an improved and enlarged range of design. The system may be aptly referred to as "torsion sonics."

In particular, an embodiment of the invention may be characterized as a hyperboloid of revolution to which vibrations are imparted by linear impulses directed tangentially on the periphery of one circular end face thereof, the other end being fixed, with consequent complex pulsation at the waist portion due to the torsional action, accompanied by piston-type vibration of the free end face.

It is therefore an object of the invention to provide a new and improved vibrator. A further object is to provide a more compact sonic vibrator, with substantially 3-dimensional output, and which has improved frequency response. More particularly, it is an object to provide a vibrator operating on the principle of torsional deformation of a concave surface of revolution, which results in changes in the enclosed volume. Yet another object is to provide a simplified method of forming vibrators having the aforesaid characteristics.

These and other ends are attained by the present invention, as described in the accompanying specification and illustrated in the drawings, in which:

FIG. 1 is a perspective view of a hyperboloid, showing, in phantom, the original, right circular cylinder from which it was derived.

FIG. 3 is a perspective view of a vibrator with hyperbolic profile.

FIG. 4 is a perspective view of a vibrator as in FIG. 2, but with fluted waist portion.

FIG. 5 is a top plan view of a blank of rhombic form.

FIG. 6 is a view similar to FIG. 5 showing the blank after being pleated.

FIG. 7 is a perspective view of the waist portion of a hyperbolic vibrator formed from the pleated blank of FIG. 6.

FIG. 8 is a perspective view, partly broken away, of a vibrator with a waist portion of the type shown in FIG. 7, and employing an axial drive.

FIG. 9 is a perspective view of a hyperbolic vibrator with axial bearing support.

FIG. 10 is a front view, in partial axial section, showing a vibrator mounted in a directional, reflecting device, and FIG. 11 is a perspective view of a modified vibrator.

Figure 2:
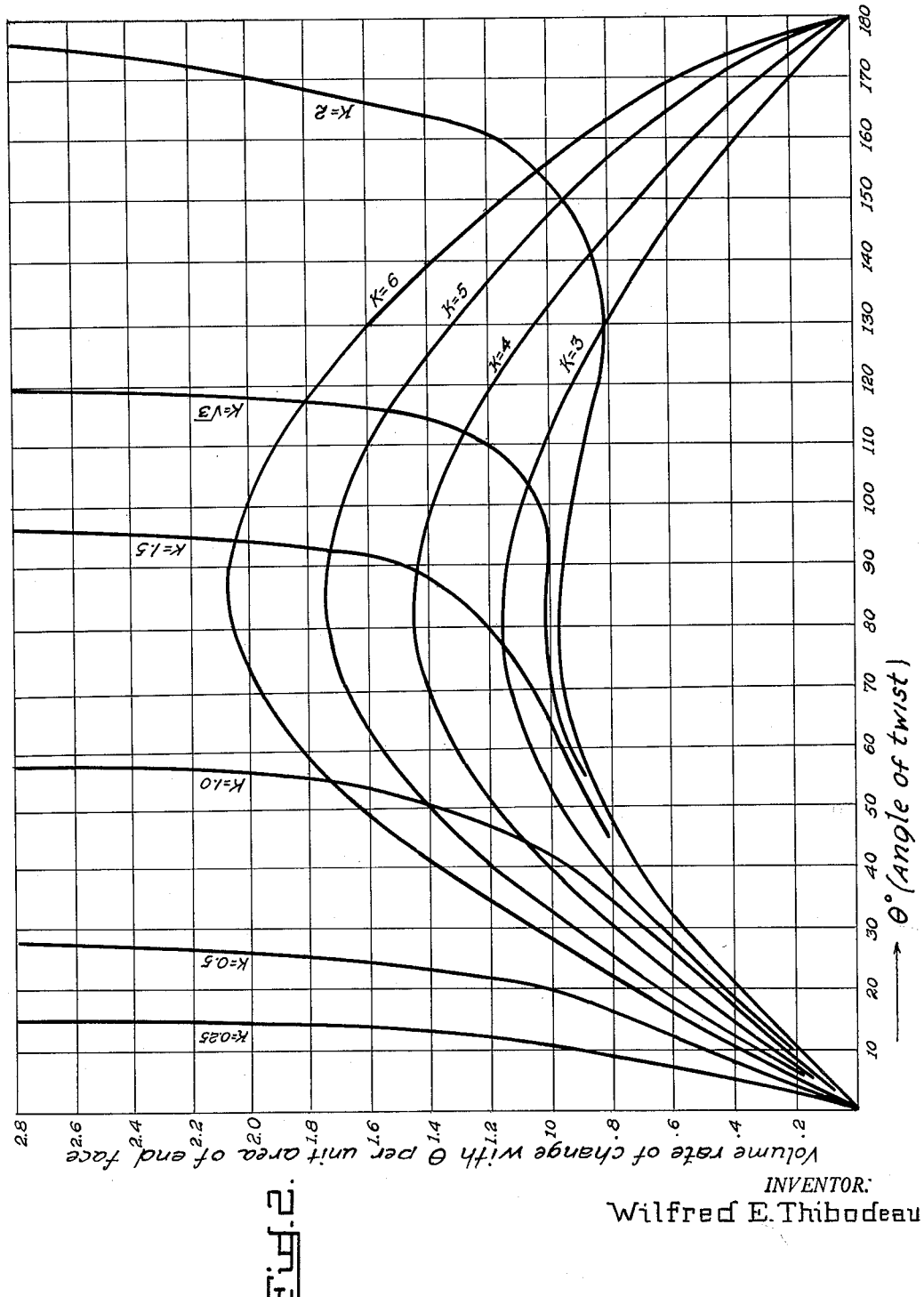
FIG. 2 is a graph in rectangular coordinates showing rate of volume change with respect to angle of twist, plotted against angle of twist.

In order to determine the volume relationships which govern the vibration, consider, as in FIG. 1, an ideal, right circular cylinder of radius $r$ and height $b$. The normal volume, $V_o = \pi r^2 b$, and is indicated in phantom lines. If one end face is fixed and the other rotated through an angle $\theta$ about the cylinder axis, the body will diminish in overall volume, and the resultant volume at any selected value of $\theta$ is given by $$V = \pi r^2 \sqrt{b^2 - 4r^2 \sin^2 \frac{\theta}{2}} \left(1 - \frac{2}{3} \sin^2 \frac{\theta}{2}\right) \quad (1)$$

or letting $b/r = K$ $$V = \frac{V_o}{3K} \sqrt{K^2 - 2(1 - \cos \theta)} (2 + \cos \theta) \quad (2)$$

The sonic disturbance is dependent upon the rate of change of volume with respect to $\theta$. This rate, assuming a constant value of K, is given by:

$$\frac{\partial V}{\partial \theta_K} = -V_o \sin \theta \frac{K/3 + 1/K \cos \theta}{\sqrt{K^2 - 2(1 - \cos \theta)}} \quad (3)$$

It will be found convenient and informative to compare this rate of volume change with that of straight piston action of an end face of the vibrator, the latter rate being given by:

$$\frac{\partial V_p}{\partial b} = \pi r^2 \quad (4)$$

The volume change in torsion may be related to the peripheral displacement of an end face, $\partial s$, since $$\partial \theta = \frac{\partial s}{r}$$

and the result is:

$$\frac{\partial V_T}{\partial S} = \pi r^2 \sin \theta \frac{K^2/3 + \cos \theta}{\sqrt{K^2 - 2(1 - \cos \theta)}} \quad (5)$$

Then the ratio of torsional volume change to piston-type volume change for identical linear displacements at the points of energy input in the two, respective types of vibrator, that is, for the case where $\partial b = \partial s$, is given by:

$$\frac{\partial V_T}{\partial S} \bigg/ \frac{\partial V_p}{\partial S} = \sin \theta \frac{K^2/3 + \cos \theta}{\sqrt{K^2 - 2(1 - \cos \theta)}} \quad (6)$$

This ratio may also be viewed as the volume rate of change per unit of area of an end face.

The results of Equation 6, computed as a family of curves for various values of the parameter K, are shown in FIG. 2.

The first thing of note is that the rate of volume change is very small at small values of $\theta$, and is zero when $\theta = 0°$. Therefore, a cylinder or any body approximating cylindrical form is of no value as a torsional vibrator. It becomes operative only in a form defined by appreciable initial deformation through an angle $\theta$.

A critical region is apparent at values of $\theta = 90°$ and $K = \sqrt{3}$. Here three significant properties are manifest: (1) The curve has a flex point, with horizontal tangent, (2) the volume rate of change is very nearly constant over a range of about 20°, and (3) the value of the volume change is identical with that due to piston action of the end face for the same linear displacement. At and below $K = 2$, the curves have sudden rises to infinity, which means that the end faces are brought into contact before the value $\theta = 180°$ is reached. Above $K = 2$ the elements of the cylinder are sufficiently long that the end faces never make this contact. For these higher values, $\theta = 180°$ may be reached, at which point the hyperboloid becomes a double cone with all elements intersecting at a single midpoint. At this point also, the rate of volume change becomes zero, because it is a transition point at which the volume ceases to diminish and commences to increase, with the cylindrical form being restored at $\theta = 360°$.

It must be understood, of course, that this treatment is ideal, since a physical, cylindrical object is capable of only a minute degree of torsional deformation without buckling. In the mathematical treatment the elements may be considered separate, infinite in number and of zero width. The mathematical treatment, however, leads to valid and useful results, in designing a vibrator which, once accomplished, is intended to operate with relatively small amplitudes of oscillation. For any desired dimensions of the vibrator, the appropriate values of K and $\theta$ are selected, the result is computed from the equations, and the device is then built in the form called for by an accomplished twist through the angle $\theta$. This is a hyperboloid, with all of its elements considered as in a normal, unstressed state. In this form, oscillations through small angles will produce a high rate of volume change.

For a rough determination of the waist profile it is sufficient to determine the value of the radius at the minimum waist portion, for a close enough approximation of the hyperbola may be drawn through the minimum radius and the maximum radii in the end faces. However, if exact treatment is desired, the curve of the waist portion may be used. This is given by:

$$y=\sqrt{\frac{4\sin^2\theta/2}{K^2-4\sin^2\theta/2}x^2+r^2\cos^2\theta/2} \qquad (7)$$

wherein $y$ is the varying radius, and $x$ is the axial distance of any radius $y$ from the midpoint of the axis to the hyperboloid. To find the minimum value of the radius, for use in the above-mentioned approximation of the curve, putting $x=0$ in Equation 7 it is seen that:

$$y_{min.}=r\cos\theta/2 \qquad (8)$$

and this is true for any value of K.

With a view to optimum utilization of 3-dimensional pulsation the relationships in FIG. 2 may be analyzed to provide information on the relative contributions of the end face and of the waist portion on the volume change. An inspection of Equation 1 shows that it consists of two algebraic terms. The positive term gives the overall, cylindrical volume of the foreshortened body at any given angle $\theta$, and the negative term gives the volume of the void between the waist portion and the imaginary walls of the foreshortened cylinder. Treating these separately for rate of change of volume with respect to $\theta$, K being constant, and taking the ratio, R, of the rate of volume change due to the end face to the rate of volume change due to the waist portion, the result is:

$$R=\frac{\partial V_e}{\partial \theta_K}\bigg/\frac{\partial V_w}{\partial \theta_K}=\frac{\partial V_e}{\partial V_w}=\frac{1}{K^2/3-1+\cos\theta} \qquad (9)$$

From this formula, the values of $\theta$ at which the decreasing contribution of the waist portion reaches zero, for several low values of K are given in the following table:

| K | 0.25 | 0.50 | 1.00 | 1.50 | 1.73 | 2.00 | 2.45 |
|---|---|---|---|---|---|---|---|
| $\theta$, degrees | 11 | 23 | 48 | 75 | 90 | 110 | 180 |

For all values of K above 2.45 the contribution of the waist portion does not vanish, but is effective in some degree throughout the full range up to 180°, and its contribution becomes increasingly greater as K increases, while at the same time, the variation with $\theta$ of its share in the output, for any given value of K, becomes progressively less appreciable.

The changing character of the curves of FIG. 2 is explainable in terms of the relative contributions of the end face and the waist portion. For any value of $\theta$ the fraction of the volume change due to the end face will decrease with increasing K for two reasons: first, because of less displacement of the end face; and second, because an increase in K necessarily involves a lesser ratio of the area of the end face to the area of the waist portion.

This effect is pronounced at the very small values of K, but the relative contribution of the waist portion increases with increasing values of K, thus compensating for the decreasing effects as to the end face; and above K=1.5 the curves of FIG. 2 become crowded in the 70° to 90° region, passing through a low, prior to converting to the sine curves for K>2. The retrograde effect in the end face is overcome by the waist portion at K=2 and for values above K=2 the total effect increases with K for any value of $\theta$.

The crowding of the curves, and hence lack of sensitivity to a change in K, will have a significance in connection with the use of pleats in the waist portion of the device, to be described later herein, for the reason that pleats involve different values of $r$, and hence different values of K in the same device. Obviously, a minimum of variation in K will result in more uniform performance in the range from the inner to the outer extremities of the pleats at any given section along the axial extent of the body.

Selecting the value $\theta=80°$ as providing the maximum, overall rate of volume change, and the value $K=\sqrt{3}$, Equation 9 will show that the situation in FIG. 2 is misleading, since the contribution of the waist portion is dropping rapidly toward zero in this region, and the total effect is not sensibly different from simple, piston action by the end face. K=2 also shows considerable variation in R at 80°, but at K=3 the value has become quite steady, ranging only from 0.33 to 1.00 in the entire 180° range. However, it may be deemed desirable to have R equal to about 1.0 at 80°, so that the waist and end portions are contributing equally. This is given by K=2.34, and it so happens in this case that the ratio of the total volume change to straight piston action is also equal to 1.0, about the same as for $K=\sqrt{3}$ in the 70° to 90° region.

A survey of the two significant ratios discussed above, for various values of K at $\theta=80°$ is given in the following table, which also introduces another ratio, that of surface areas of the end face and waist portion:

| K | 1.73 | 2.00 | 2.34 | 3.00 | 4.00 | 5.00 | 6.00 |
|---|---|---|---|---|---|---|---|
| End face/waist—Vol. change ratio | 5.75 | 1.97 | 1.00 | .46 | .22 | .13 | .09 |
| Ratio of total pulsation to piston action | 1.00 | .97 | 1.00 | 1.15 | 1.45 | 1.75 | 2.10 |
| Ratio of surfaces—End face/waist | .29 | .25 | .21 | .17 | .12 | .10 | .08 |

While certain values have been selected for illustration to assist in design problems, and some figures have been noted as significant, it will be understood that selection of values of K and $\theta$ is a matter subject to considerable latitude depending upon the particular result sought. For instance, if it is desired to emphasize selective frequency response, a higher value of K, with a correspondingly longer waist portion will be used, since inertial and other characteristics, including stiffness, vary continuously, along the waist portion in the axial direction of the body. In particular, at K=6, the contribution of end face and waist portion are in about the same ratio as their areas, and the total effect is twice that of piston action.

For purposes of illustration, the values K=2.34 and $\theta=80°$ will be used for each embodiment shown in the drawings.

Referring now to the drawings, by characters of reference, there is shown in FIG. 3 a simplified device comprising a hollow body in the form of a hyperboloid of revolution, with waist portion 2 and closed, top end face 3, the periphery of the bottom face being suitably fixed, as by screws 4, to a base 5 so as to be held against movement. The body may be constructed of parchment, stiff cloth or felt, cardboard, or any suitable material known in the conventional art of loud-speakers. Two electromagnetic devices 6 and 7 of conventional design, have armatures 8, 9, engaging projections 10, 11, extending from the extermities of a diameter of end face 3, the armatures being so arranged that both cause circular movement of the end face in the same direction when energized, and the electromagnets being wired in parallel to the source of the signal-producing energy.

For very small values of the angular change in torsion the vibrator will give reasonable response without undue buckling, but in order to minimize resistance in the system, resort may be had to pleating or fluting of the waist portion, as shown in FIG. 4.

It should be understood that the devices of FIGS. 3 and 4 have the inherent characteristic that pulsations about the rest position of the projections 10, 11, are converted to double frequency, since movement away from the mean position, in either direction, results in diminution of the volume. This may be overcome by subjecting the vibrator to bias, by impressing an initial degree of torsion, with or without benefit of pleating. Preferably, however, the situation is remedied by embodying slanted elements in the device in the following manner:

In order to provide a response accurately related to the ideal conditions existing after mathematical, torsional movement through the angle $\theta$, I provide an embodiment of the type with pleats, in which the slant of the pleats actually corresponds with that of the ultimate position of the original elements of the right circular cylinder, as mathematically treated above. This expedient constrains the action of the vibrator to the behavior called for by Equation 1 or 3, and any vibration in torsion necessarily results, alternatively, in a volume-diminution action called for in the mathematical treatment, and a retrograde action in which the volume is increased. Thus, the alternating character of the applied signals is preserved.

Accordingly, as shown in FIG. 5, I provide as a blank, a skew parallelogram or rhomboid 12 of proper material, such as parchment, with slant, end edges 13, 14, inclined to the vertical at an angle roughly corresponding to the angle $\gamma$, defined in FIG. 1. Pleats 15 are then formed along a series of lines parallel to the slant, end edges, with the result shown in FIG. 6. The slant ends 13, 14, are then brought together, by abutment or overlap and secured as at 16, whereupon the piece resolves itself into the form of a hyperboloid of revolution, as shown in FIG. 7. With this arrangement, it will be seen that rotation of the upper periphery counterclockwise away from its normal position of rest will result in diminution of the volume, while rotation in the opposite sense will result in volume increase.

A further important feature of the slanted pleat modification shown in FIG. 7 is that the action is reversible. In other words, twisting of the end face and of the waist, and consequent change of volume of the vibrator can be occasioned by a force applied to the end face in the direction of the axis of rotation of the body. This is illustrated in FIG. 8 in which the driving arm 17 of a conventional loudspeaker electromagnetic unit 18 passes through the body 19 axially and is attached to the center of the conical end face 20 of the body. Preferably the end face will have more stiffness than the conventional speaker disc, since the thrust must be imparted from its periphery to the waist portion. However, as in other features of the design of the present invention, considerable latitude in this regard will be tolerable. Also, in other forms of the invention, as in this case, the end face may be other than planar, and in particular may have the conventional cone shape, with apex extending either inwardly or outwardly of the body.

In FIG. 9 is illustrated an embodiment in which the device is centered on a rod 21 for steadying purposes, the end face being provided with a suitable anti-friction bearing element 22. This form will require only one driving device, 23.

In FIG. 10 the hyperboloid vibrator is shown mounted in a parabolic reflector 24, to provide directional characteristics.

FIG. 11 shows another form of the device in which one half only of the hyperboloid is employed, and in which the end face has the conventional, concentric pleats 25 of dynamic speaker discs.

If deemed necessary or desirable, sound baffles or mufflers or the like may be provided within the enclosed volume of my vibrator, in accordance with teachings of the prior art to the extent they may be found pertinent.

I am aware that 3-dimensional vibrators have heretofore been suggested, and that in particular the general idea of torsional actuation of a cylindrical member has been put forth. The peculiar make-up of some piezo-electric crystals has lent itself to torsional generation of vibrations, and in some instances these crystals have been shown as covered with an outer envelope, slightly twisted to the kinking or buckling stage. However, all of the prior art has consistently failed to penetrate the problem sufficiently to appreciate the significance and all-importance of providing a sidewall portion having a substantially dished, concave profile, in the natural, unstressed condition of the body, all as demonstrated by the mathematical treatment given herein.

It will be understood that whereas the vibrator is referred to in the specification and certain of the claims as a hyperboloid, in actual practice the required degree of precision will not demand close adherence to such mathematical form, and the profile of the vibrator may, as well, approximate other concave forms, such as a circular arc, a catenary, etc., without serious impairment of results, the main consideration being that the degree of concavity be sufficient to afford an appreciable volume rate of change.

While certain preferred forms of the invention have been shown and described for purposes of illustration, it will be understood that equivalents exist, and that reasonable modifications may be made in the practice of the invention without departing from the spirit or scope of the following claims. For instance, a hyperboloid, preferably of large K value, may be mounted on the tone arm of a phonograph, and carry a radially extending needle on the free, outer end face for engagement with the groove of a record. The resulting vibrations may be utilized per se, or amplified by suitable means.

I claim:

1. A sonic vibrator comprising a hollow structure of generally circular cross section, having substantially concave side walls of generally arcuate form in their normal, unstressed state, and means operatively associated with said structure, and arranged to subject said structure to torsion about its axis.

2. A sonic vibrator comprising a hollow structure of generally circular cross section, said structure having a side wall generally hyperbolic in profile, in its normal, unstressed state, and means operatively associated with said structure, and arranged to subject said structure to torsion about its axis.

3. A sonic vibrator comprising a hollow structure of generally circular cross section, said structure in its normal, unstressed state, having a substantially concave side wall terminating in a peripheral rim, and means operatively associated with said structure, and arranged to impart circular motion to said rim whereby to subject said structure to torsion about its axis.

4. A sonic vibrator comprising a hollow structure of generally circular cross section, said structure in its normal, unstressed state, having a substantially concave side wall terminating in a peripheral rim, an end face on said peripheral rim and means operatively associated with said structure, and arranged to rotate said end face about the axis of said structure whereby to impart torsion to said structure about its axis.

5. A sonic vibrator comprising a hollow structure having, in its normal, unstressed state, substantially concave side walls pleated in the direction of their length, and means operatively associated with said structure, and arranged to subject said structure to torsion about an axis generally parallel to said direction.

6. A sonic vibrator comprising a hollow structure of generally circular cross section, having, in its normal, unstressed state, substantially concave side walls pleated in the direction of the axis of said structure, and means operatively associated with said structure, and arranged to subject said structure to torsion about the axis of said structure.

7. A sonic vibrator comprising a hollow structure of generally circular cross section, having, in its normal, unstressed state, a substantially concave side wall generally hyperbolic in planes containing the axis of said structure, an end face on said side wall, and means operatively associated with said structure, and arranged to rotate said end face about the axis of said structure whereby to subject said structure to torsion.

8. A sonic vibrator comprising a hollow structure of generally circular cross section having in its normal, unstressed state a substantially concave side wall with pleats arranged at an angle to the axis of said structure.

9. In a device as in claim 8, means operatively associated with said structure and arranged to rotate a terminus of said side wall about the axis of said structure.

10. In a device as in claim 8, means operatively associated with said structure and arranged to move a terminus of said side wall generally axially of said structure, the pleated wall acting to convert said motion to torsion of said structure.

11. A sonic vibrator comprising a hollow structure of generally circular cross section, having in its normal, unstressed state a substantially concave side wall with pleats arranged at an angle to the axis of said structure, and means operatively associated with said structure, and arranged to subject said structure to torsion about its axis.

12. A sonic vibrator comprising, in its normal, unstressed state, a hollow structure of generally hyperbolic form of substantial concavity in a plane containing the axis of said structure, and having pleats arranged at an angle to said axis, and means operatively associated with said structure, and arranged to subject said structure to torsion about said axis.

13. A sonic vibrator comprising, in its normal, unstressed state a hollow structure of generally circular cross section, with a substantially concave side wall having pleats arranged at an angle to the axis of said structure, said sidewall having a circular, terminal end, an end face on said end, and means operatively associated with said structure, and arranged to subject said structure to torsion about its axis.

14. A device as in claim 13, said means arranged to impart circular motion to the terminal end of said side wall.

15. A device as in claim 13, said means arranged to move said end face axially of said structure, said pleats acting to convert said movement to torsion of said structure.

16. A sonic vibrator comprising, in its normal, unstressed state a hollow structure in the form of a hyperboloid of revolution of substantial concavity.

17. A sonic vibrator comprising, in its normal, unstressed state a hollow structure in the form of a hyperboloid of revolution of substantial concavity, the hyperbolic portion of said container being pleated.

18. A sonic vibrator comprising, in its normal, unstressed state a hollow structure in the form of a hyperboloid of revolution of substantial concavity, the hyperbolic walls of said structure being pleated at an angle to the axis thereof.

19. A method of making a hollow structure in the form of a hyperboloid of revolution which comprises providing a blank in the form of a rhomboid of substantial angularity with respect to a rectangle, forming pleats in said blank parallel to two of the parallel ends thereof, and bringing said two ends into juxtaposition and securing them together.

References Cited in the file of this patent

UNITED STATES PATENTS

| | | |
|---|---|---|
| 1,036,529 | Lumiere | Aug. 20, 1912 |
| 1,158,024 | Bird | Oct. 26, 1915 |
| 1,709,073 | Hartley | Apr. 16, 1929 |
| 1,742,265 | LaRue | Jan. 7, 1930 |
| 2,346,135 | Kress | Apr. 11, 1944 |

FOREIGN PATENTS

| | | |
|---|---|---|
| 263,411 | Great Britain | Dec. 22, 1926 |